United States Patent
Palvianen

(10) Patent No.: US 6,662,005 B1
(45) Date of Patent: Dec. 9, 2003

(54) DATA ACCESS IN A TELEPHONE SYSTEM

(75) Inventor: Keijo Palvianen, Helsinki (FI)

(73) Assignee: Nokia Corporation, Espoo (FI)

(*) Notice: Subject to any disclaimer, the term of this patent is extended or adjusted under 35 U.S.C. 154(b) by 0 days.

(21) Appl. No.: 09/544,668

(22) Filed: Apr. 6, 2000

Related U.S. Application Data

(63) Continuation of application No. PCT/FI98/00795, filed on Oct. 14, 1998.

(30) Foreign Application Priority Data

Oct. 14, 1997 (FI) .................................................. 973955

(51) Int. Cl.$^7$ ............................................. H04M 11/10
(52) U.S. Cl. .................... 455/414.1; 455/416; 455/418; 455/422; 455/426; 379/219; 379/220; 379/249; 709/201.01; 709/201.03; 709/202.01; 709/204.01; 709/238; 370/396; 370/400
(58) Field of Search ................................ 455/414.1, 416, 455/418, 422, 426; 379/219, 220, 249; 709/201.01, 201.03, 202.01, 204.01, 238; 370/396, 400

(56) References Cited

U.S. PATENT DOCUMENTS 5,512,885 A * 4/1996 Agestam et al. ....... 340/825.52
5,987,520 A * 11/1999 Libby et al. ................. 709/238
6,097,949 A * 8/2000 Jung et al. ................... 455/466
6,466,786 B1 * 10/2002 Wallenius .................... 455/433
6,501,948 B1 * 12/2002 Salin ............................ 455/417

OTHER PUBLICATIONS

1999, Digital cellular telecommunications system (Phase 2+); Closed User Group (CUG) Supplementary Services—Stage 1 (GSM 02.85 version 6.0.0 Release 1997); ETSI TS 100 518 V6.0.0.

* cited by examiner

Primary Examiner—William Trost
Assistant Examiner—Danh Le
(74) Attorney, Agent, or Firm—Squire, Sanders & Dempsey L.L.P.

(57) ABSTRACT

The inventive idea is to define a closed user group including the access point of a data network and users of a service. Such incoming calls are barred, which come from outside the user group to the access point of the data service. Calls within the user group coming to the access point are allowed. Hereby the telephone system itself prevents users outside the user group of the data service from gaining access to the network.

19 Claims, 5 Drawing Sheets

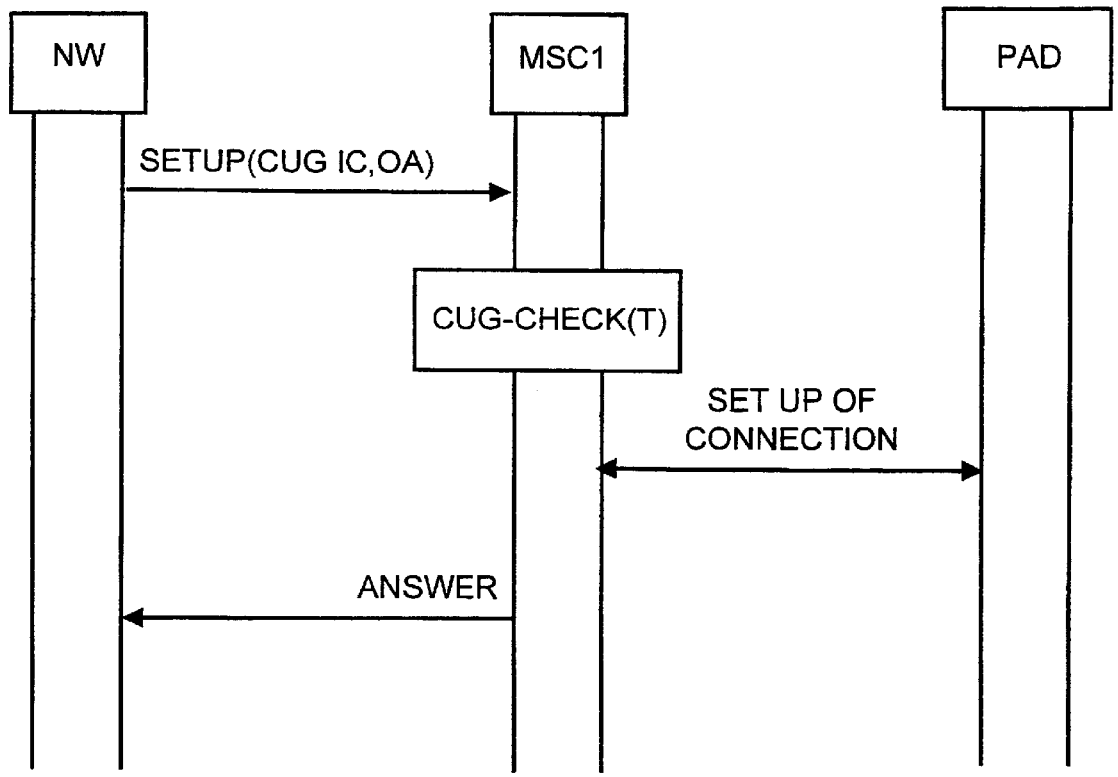

DATA ACCESS IN A TELEPHONE SYSTEM

This application is a continuation of international application Ser. No. PCT/FI98/00795 filed Oct. 14, 1998.

FIELD OF THE INVENTION

This invention relates to an improvement of the data security of data access in a telephone system. Quite especially, the invention relates to an improvement of the data security of direct data accesses connected to mobile communications systems.

BACKGROUND OF THE INVENTION

As the data transmission capacity of telephone systems is increasing, as the services provided by data networks are improving and as the use of data networks, such as the Internet, is becoming more general, the need for connecting the telephone system directly to data networks has grown. To meet this demand, Direct Data Accesses DDA have been developed, wherein the exchange of the telephone network is connected directly to the data network.

FIG. 1 shows such an arrangement by way of example, wherein there is a direct data access from a Mobile Switching Centre MSC to an Asynchronous Transfer Mode or ATM network, to a Public Switched Packet Data Network PSPDN, to a Private Network PN, to a Local Area Network LAN and to a data network in accordance with the X.25 protocol. Through the exchange, data services may be used by mobile stations directly subordinated to the exchange, such as Mobile Stations MSa, by mobile stations MSb subordinated to other mobile services switching centres, such as MSC2, which are connected to the exchange through the network, and by subscriber equipment, such as Fixed telephone network Subscribers FS, of other systems which are connected to the exchange through an Integrated Services Digital Network ISDN.

MSC is connected to an ATM network with an IWF matching unit. The matching unit collects data transmitted by the subscriber in the form of a circuit switched data signal and from this it forms packets or cells of a fixed length suitable for transmission to the ATM network. The circuit switched data signal may be e.g. in accordance with the CCITT V.24/V.28, CCITT V.110 or CCITT V.120 standards (CCITT=Comité Consultatif International de Télégraphique et Téléphonique). Correspondingly, the matching unit sends information contained in the cells which it receives from the ATM network and which is to be sent to the user and transmits it to the user in a circuit switched form. To make possible several connections in parallel, several matching units in parallel may be used.

The exchange is connected to the public switched packet data network by a Packet Handler PH, which converts the circuit switched data signal into a data packet flow in accordance with a protocol, such as the Transport Control Protocol/Internet Protocol TCP/IP, which is used in the public data network. The packet handler functions as the access point to the data network in relation to the telephone system. Several packet handlers may be connected to the exchange, whereby several simultaneous connections may be set up with the data network.

To a private network PN, such as the in-house network of a company, the exchange is connected by an IWF (InterWorking Function) matching unit, which converts the circuit switched data signal in accordance with the protocol used in the private network. The matching unit is connected to the private data network by a fixedly allocated subscriber line, which functions as the access point to the data network. Several matching units may be connected to the exchange, whereby several simultaneous connections may be set up with the data network.

The exchange is connected to a LAN local area network by an IWF matching unit and by a LAN ROUTER connected to the former. The exchange may be connected to the router with several subscriber lines, whereby several simultaneous connections can be set up with the LAN network. The router functions as both access point to the data network and a concentrator collecting in a buffer the data packets received in parallel from the different subscriber lines and supplying them to the data network in series form.

In a fifth connection method, the packet network, which in the figure is a data network in accordance with the X.25 protocol, is connected to the exchange with the aid of an IWF matching unit and a Packet Assembler/Disassembler PAD. The matching unit sends to the packet assembler/disassembler functioning as the access point to the data network a circuit switched data signal, which may be e.g. in accordance with the CCITT V.24/V.28 or CCITT V.110 standards. Of the circuit switched signals the packet assembler/disassembler forms packets, buffers the packets and supplies them to the data network in series form.

Furthermore, the mobile switching centre may be connected to a PDN packet data network with the aid of an IWF matching unit and an Access Router AR. The AR is connected to a (Pulse Code Modulation) PCM matching unit by a conductor on which a protocol in accordance with the CCITT V.110 or CCITT V.120 standard is used. The access router converts the circuit switched data signal going to the packet network so that it is in accordance with the packet data protocol used in the packet network, and sends it to the packet data network. The packet switched data which it receives from the packet data network the access router converts into a circuit switched data signal to be sent to the exchange. The exchange is connected to the access router by exchange signalling, such as e.g. signalling in accordance with the 30B+D standard, the DPNSS (Digital Private Network Signalling System) or the QSIG international signalling standard for corporate networks. Differing from the other data accesses shown in FIG. 1, the mobile switching centre may set up signalling connections with the access router outside the traffic channel.

Data security is one of the major problems with data accesses. Since data networks very often contain information which must be kept secret from outsiders, access of outsiders to the network must be prevented. In connection with chargeable data services, the network operator to be able to charge needs the identity of the user using the network services. Also in this case, it must be possible to prevent any user assuming a false identity from gaining access to the network services. However, in the system shown in FIG. 1, anyone who learns the call number of a data network service will gain access to the network and thus to use services of the network.

FIG. 2 shows a state-of-the-art arrangement in a mobile communications system for preventing switching-on under a false identity to a HOST server located in a data network. Mobile station MS requests connection set-up of that mobile switching centre MSC2 under which it is located at the moment. On receiving the request for a connection set-up, the MSC2 authenticates the mobile station (step P1) to make sure that the mobile station has given a true subscriber identity. Having ensured the identity of the mobile station, the MSC2 sets up a connection with that exchange MSC1, which by way of the PAD packet assembler/disassembler is directly in connection with the data network. MSC1 switches on to the packet assembler/disassembler, which sends back to the subscriber a request to perform an authentication procedure based on the use of a password (step P2). In response to the request, the subscriber supplies his user identification and his password. The packet assembler/disassembler checks if the password given by the user is the same as the password stored in its own user database. If this is the case, the subscriber is given access to the data network. Otherwise access is barred.

Inside the data network, the network elements trust one another (step P3). Hereby all subscribers who have been given access to the network have access to all servers of the network, unless these are separately protected, e.g. by authentication procedures based on the use of a password. After the authentication, the packet assembler/disassembler located in the exchange begins to convert the circuit switched data flow received from the mobile station into packet form and to send it in packet switched form through the data network and further to the HOST server. Correspondingly, the packet assembler/disassembler receives from the HOST server in the data network packet switched data, which is converted by the packet assembler/disassembler into circuit switched form and which is sent on the circuit switched connection to the MS mobile station.

FIG. 3 shows another state-of-the-art arrangement in a mobile communications system for preventing switching-on under a false identity to a HOST server located in a data network. The connection set-up from the mobile station to the MSC1 exchange, which is connected directly with the data network through a PAD packet assembler/disassembler, is set up exactly in the same manner as in the example shown in FIG. 2. However, the packet assembler/disassembler does not authenticate the subscriber, but it sends in packet form a request for connection set-up to the HOST server. Hereby anybody who knows the call number of the PAD packet assembler/disassembler may set up a connection with the HOST server. To prevent unauthorised use of the server, authentication procedures are used, wherein the user sends his user ID and his password to the server in the data network. The server checks if the password given by the user tallies with the password stored in the server's user database. If it does, the subscriber is given access to the server. If it does not, access is barred.

However, there are some problems with state-of-the-art authentication methods. Firstly, the data network must include means for performing the authentication procedure- and for maintaining the password database required by the procedure. However, these are not available in all data networks and at their access points, e.g. in the packet assemblers/disassemblers, whereby anybody has access to use the services of the data network by dialling the call number of the packet assembler/disassembler. Nor is it often sensible to implement the password authentication in a server-specific manner, since the number of password databases which must hereby be maintained will often become too high. In addition, the user when setting up the connection must remember his user ID and the corresponding password, the number of which may be considerable with a user using many different systems.

It is an objective of this invention to solve the problems described above. The objective is achieved with the method described in the independent claims.

BRIEF DESCRIPTION OF THE INVENTION

The inventive idea is to define a closed user group formed by the access point to the data network and by the users of a service. Incoming calls coming from outside the user group to the access point of the data network are barred. Calls inside the user group coming to the access point are given access. Hereby the telephone system in itself prevents users outside the data service's user group from gaining access to the network.

The user of the data service when taking contact with the data network states the user group formed by users of the data service as the user group of the call to be set up. This information can be established in the user's subscriber data as the default user group of the basic service in question, whereby the information need not be given manually when the call is set up. The telephone system when setting up the call checks whether the user belongs to the user group mentioned in the call set-up data and whether he is otherwise entitled to the call. If the user is entitled to the call, set-up of the call is continued to that exchange from which there is a direct connection with the data network.

The exchange which has a direct connection with the data network checks if the access point to the data network allows set-up of the call. Set-up of the call is allowed only if the access point belongs to the user group given by the user requesting set-up of the connection.

The telephone system is preferably a mobile communications system, whereby the identity of the user requesting set-up of the connection can be verified through known authentication procedures of the mobile communications system.

LIST OF FIGURES

The invention will be described more closely referring to the appended drawings, wherein FIG. 1 shows an arrangement for connecting subscriber equipment to a data network;

FIG. 6 shows set-up of an incoming call;

FIG. 7 shows a user's service record;

DETAILED DESCRIPTION OF THE INVENTION

It is known in telecommunication systems to define closed user groups CUG e.g. defined by the staff of a company or by a certain circle of friends. The services of a user group may be different as regards the services and e.g. cheaper than normal calls.

Use of a closed user group in a telecommunication system is described in the GSM 02.85 specification published by the ETSI (ETSI=European Telecommunications Standards Institute). According to the specification, such different subscriber options may be defined for a subscriber belonging to a closed user group, which indicate what kinds of call the subscriber may receive or make. These subscriber options are 1. CUG calls only; the subscriber may set up calls only with subscribers of his own CUG group;
2. Access for CUG and incoming calls; the subscriber may set up calls with subscribers of his own CUG group and may also receive incoming calls coming from outside his own CUG group (IA, Incoming Access);

3. Access for CUG and outgoing calls; the subscriber may set up calls with subscribers of his own CUG group and he may also make outgoing calls going outside his own CUG group (OA, Outgoing Access); and 4. Access for CUG and outgoing and incoming calls; the subscriber may set up calls with subscribers of his own CUG group and he may also make outgoing calls going outside his own CUG group and receive incoming calls coming from outside his own CUG user group (IA+OA).

In addition, restrictions inside the user group may be defined for the subscriber, 1. ICB, Incoming Calls Barred within a CUG; and
2. OCB, Outgoing Calls Barred within a CUG.

A subscriber may belong to several closed CUG user groups at the same time, some of which may be chosen as the default group, which is used in the set-up of outgoing calls, unless otherwise mentioned separately for the individual call.

According to the present invention, such a user group is defined in a telephone system which includes the data network's access point and users of the data network. The access point can also be defined as belonging to several smaller user groups, whereby the users of the data network are in some way divided into these groups. This grouping may be used to advantage e.g. in keeping statistics on and in charging of calls.

Figures 4, 5:
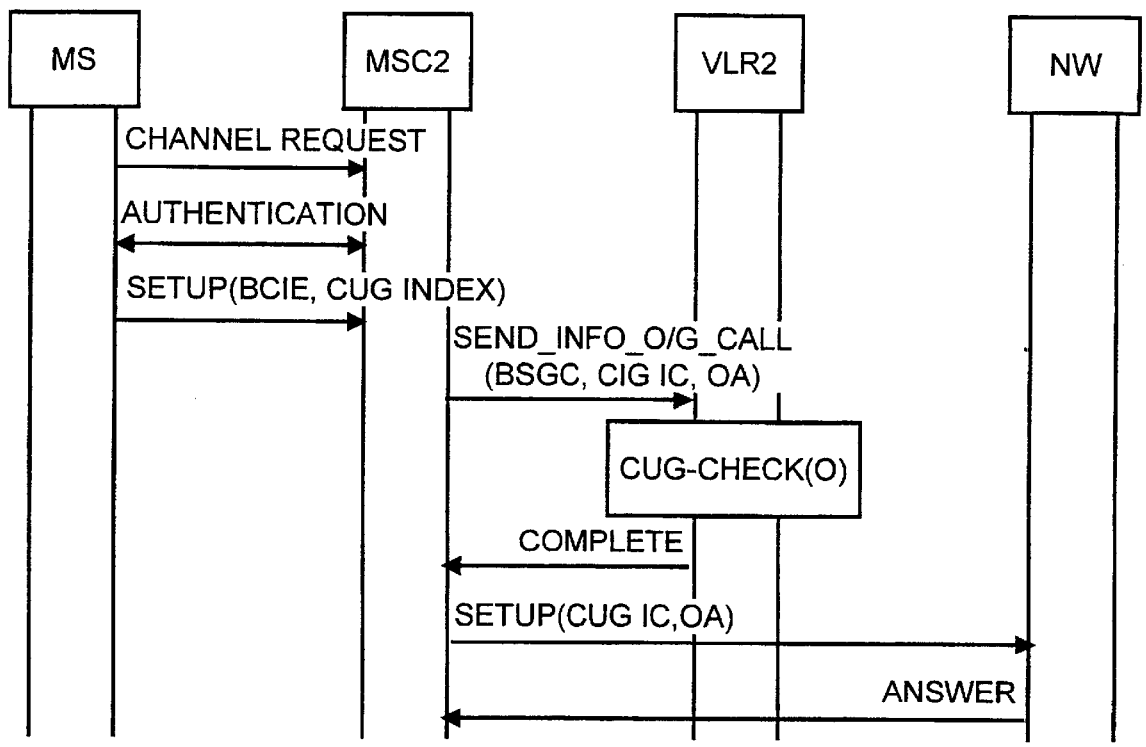
FIG. 4 shows set-up of an outgoing call.
FIG. 5 shows a user's service record.

FIG. 4 shows the progress of a set-up of a call in accordance with the invention which is going out from a subscriber. After the mobile station has made a CHANNEL REQUEST for set-up of a connection, the mobile switching centre MSC2 checks the mobile subscriber's identity through an authentication procedure AUTHENTICATION. If the identity is proved false, set-up of the call is broken off. If the identity given-by the mobile station proves to be true, set-up of the call is started with the information given by the mobile station, which is the BCIE (Bearer Capability Information Element) and the CUG INDEX user group data. If the user does not separately and manually define any user group data for use in connection with the call set-up, that default data will be used in the call set-up which he has established in advance.

When setting up a data call in a packet data network, the subscriber uses a BA6 basic service, which is the PAD service to use when switching on to packet data networks at a transmission rate of 9600 bits a second. If the user group of the data network's access point is the user group defined by the subscriber as default value when using this basic service, the subscriber need not give it separately in the call set-up. However, the use of a default value user group must not be prevented in the individual call. If the user's default value user group is different from the user group of the data network's access point, the subscriber when setting up the data call must separately input the CUG INDEX of the true user group.

Next, the exchange checks (CUG-CHECK(O)) whether the mobile station has the right to a set-up of the CUG call he has requested. This is done with the aid of the BCIE service identifier received from the subscriber, with the CUG INDEX of the user group data, with subscriber data stored in the visitor location register VLR and with a special authorisation function.

FIG. 5 shows storing of data relating to closed user groups in the home location register HLR of a subscriber entitled to access to a data network. The data stored in the subscriber's visitor location register VLR is a copy of the data shown in the figure. The IMSI (International Mobile Subscriber Identity) is the key to the record. A list of the call services to which the subscriber has a right is appended to the subscriber identity. The services are distinguished from each other by using BSGC (Basic Service Group Code) codes. With the services are combined CUG INDEX LIST data of the user groups available to the subscriber, DEFAULT CUG INDEX of the closed user group to be used primarily in the call set-up, data on OA outgoing access for calls going outside the group and data on incoming access for calls coming from outside the group.

In the example shown in FIG. 5, in connection with a T11 call service the subscriber is defined to belong to user groups, the CUG INDEX of which is 1, 3 or 4. Of these that user group is defined to be used primarily, the CUG INDEX of which=1. There is access both for calls going outside the group and for calls coming from outside the group (OA=T, IA=T). Correspondingly, in connection with fax service T62 of group 3, the subscriber belongs to groups, the CUG INDEX of which are 1, 3 and 4, while that user group is used primarily, the CUG INDEX of which=1. There is access both for calls going outside the group and for calls coming from outside the group (OA=T, IA=T). When switching on to packet data networks at a transmission rate of 9600 bits a second in connection with a BA6 PAD service, the user belongs to that user group only, the CUG INDEX of which=2. Outgoing calls going outside the group are barred (OA=F, False), but there is access for incoming calls from outside the group (IA=T, True).

In addition to service data and primary CUG groups relating to services, the visitor location register stores a description of the CUG IC network-specific group attributes for use between the subscriber-specific CUG INDEX group attributes and the exchanges. ICB and OCB call restrictions within the user group are also defined on a user group basis. In the example shown in the figure, the subscriber's user group CUG INDEX 1 corresponds to the CUG IC 101 network-specific identifier, while CUG INDEX 2 corresponds to CUG IC 12, CUG INDEX 3 corresponds to CUG IC 1 and CUG INDEX 4 corresponds to CUG IC 14. In the example shown in the figure, the subscriber may both receive and set up calls within the group in all user groups.

The mobile switching centre uses a SEND_INFO_O/G_CALL message (FIG. 4) to ask the visitor location register VLR if the subscriber has the right to the call set-up he has requested. If he does not, the connection set-up is barred. Having made sure that the mobile station is entitled to set-up of the call it requested, MSC2 sets up a connection through NW (Network) with that exchange MSC2, which is in direct connection with the data network by way of the access point in the example, that is, through. the packet assembler/disassembler PAD. MSC2 provides the exchange MSC1 with the user group data defined by the user. For this to be possible, the signalling between exchanges must support transmission of CUG data. Such signalling is e.g. the international ISUP (ISDN User Part) and the national TUP93 (Telephone User Part 93) which is used in Finland and the IUP (Interconnect User Part) which is used in England. In this part the user group is identified using a CUG IC identifier which unambiguously defines the user group within the network. Having sent the request for a connection set-up, the MSC2 remains waiting for ANSWER from MSC1. If the mobile subscriber's current exchange MSC2 itself has a direct connection with the data network, the connection set-up between exchanges through the network will of course not take place.

FIG. 6 shows set-up of a finishing call. Having received the SETUP(CUG IC, OA) request for a connection set-up from the NW network, MSC1 checks (CUG-CHECK(T)) if the requested call can be set up. The user group data defined by the calling subscriber and received in the request for a connection set-up as well as the user group data defined by the recipient of the call, that is, for the PAD access point of the data network, is used in the check. If it is found in the check that the call may be set up, a connection with the data network is set up by way of the PAD packet assembler/disassembler. In addition, an ANSWER message is used to give a notification of the connection set up to the exchange which made the request for a connection set-up.

FIG. 7 shows a record for use in the storing of the user group data defined for the data network's access point. The record is preferably maintained in that MSC1 exchange, which has a direct connection with the access point. The call number of the access point, that is, the ISDN number (ISDN Integrated Services Digital Network) functions as a key to the record. A list is appended to the call number of the basic services to which the connection is entitled. Services are distinguished from each other with the aid of BSGC (Basic Service Group Code) service codes. Combined with the services are CUG INDEX LIST data about the user groups available to the connection, DEFAULT CUG INDEX about the closed user groups to be used primarily in the call set-up, data on OA access for outgoing calls going outside the group and data on access for incoming calls coming from outside the group.

In the example shown in the figure, only one basic service is defined for the connection, that is, the BA6 PAD service for use at a transmission rate of 9600 bits a second. The connection belongs to one user group only, the CUG INDEX of which=1. In accordance with the invention, incoming calls from outside the group are barred (IA=F). Besides this, outgoing calls going outside the group are also barred (OA=F) in the example shown in the figure.

In addition, the database of the exchange stores a description of the CUG IC network-specific group attributes for use between the CUG INDEX subscriber-specific group attributes and the exchanges. The ICB and OCB call restrictions within the group are also defined on a user group basis. In the example shown in the figure, the subscriber's user group CUG INDEX 1 corresponds to the CUG IC 12 network-specific identifier. The connection may both receive and set up calls within the group in all user groups (ICB=F, OCB=F).

Figure 8:
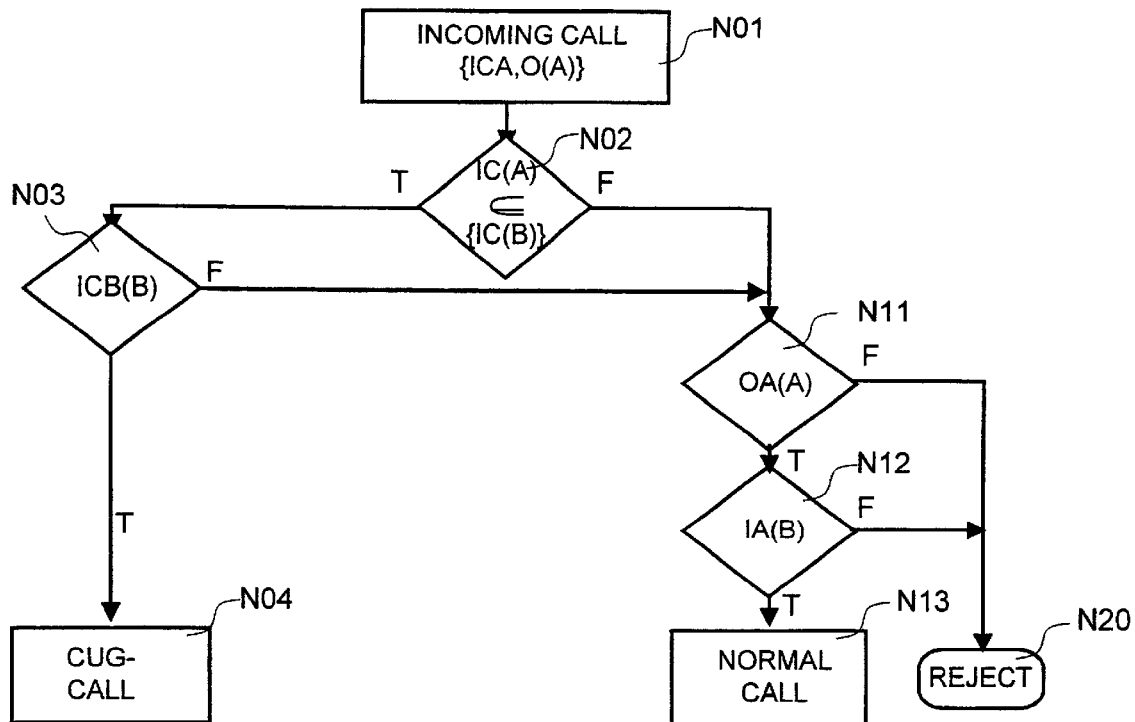
FIG. 8 shows a check made when setting up a call of a finishing closed user group.

FIG. 8 shows a CUG-CHECK(T) user group check to be made in the MSC1 exchange. The check is started after the MSC1 exchange has received the SETUP(CUG IC, OA) request for a call set-up containing user group data (step N01). The exchange first checks whether MSB belongs to the CUG user group defined by subscriber A by comparing subscriber B's IC(B) group identifiers with the IC(A) group data given by subscriber A (step N02). If it is found that subscriber B belongs to the defined user group (IC(A)∈{IC(B)} is true), the function proceeds to step N03, where it is checked if MSB has barred incoming calls within the group (ICB). If calls within the group are allowed (ICB(B) is false), the call set-up is continued as a CUG call (step N04). A check is also made of possible call forwarding, although such is not made in practice at the data network's access point, which is why it is of no significance to the invention.

If it is found in step N02 that subscriber B does not belong to the user group defined by subscriber A (IC(A)∉ {IC(B)}), or if it is found in step N03 that subscriber B has barred calls within the group, progress is made to steps N11 and N12, where it is checked if the call can be set up as a normal call. A check is made in step N11 of whether subscriber A has allowed the call to go outside the group (OA(A)) and in step N12 it is checked whether subscriber B has allowed incoming calls coming from outside the group (IA(B)). If both conditions are fulfilled, the call is continued as a normal call (step N13). If even one condition of steps N11 and N12 is not fulfilled, the call is rejected (step N20).

Since according to the invention, calls outside the group are barred at the data network's access point, condition N12 is not fulfilled with calls ending at the access point. Under these circumstances, a connection will be set up only if the access point belongs to a closed user group defined by the user (condition N02). Since no barring is defined at the access point of incoming calls within the closed user group, the call will always be set up, if the access point belongs to the closed user group defined by the user.

Having found that there is access for the call, MSC1 switches on to the packet assembler/disassembler and the subscriber is given access to the data network.

Figure 9:
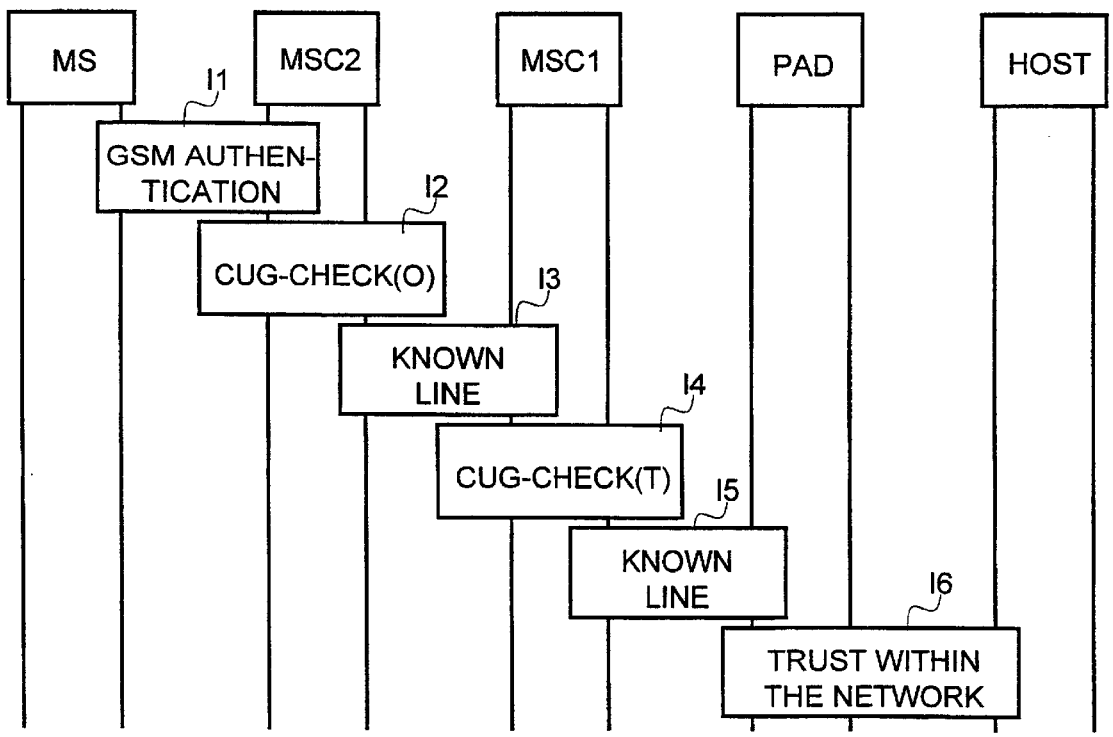
FIG. 9 shows an authentication process.

FIG. 9 shows the authentication process of the resulting connection. Based on the authentication according to the mobile communications system between the mobile station and the mobile switching centre MSC2, the MSC2 trusts the identity given by the mobile station (step I1). Having checked the subscriber's right to use the closed user group defined in the call (step I2), MSC2 can be sure that the subscriber who made the request for a connection set-up belongs to the defined user group. Between the mobile switching centres MSC2 and MSC1 the connection uses such fixed lines between the exchanges which are considered reliable by both (step I3). Thus the MSC1 can be sure that the subscriber who made the request for a connection set-up belongs to the defined user group. MSC1 continues to set up the call to packet assembler/disassembler PAD only if based on the access data of the packet assembler/disassembler it finds that the packet assembler/disassembler belongs to the user group defined by the subscriber (step I4). The packet assembler/disassembler is connected to MSC1 in a dependable manner (step I5), so it can be sure that all calls set up all the way up to itself have come from subscribers who belong to the same user group as the packet assembler/disassembler and who are thus reliable. Within the data network the network elements trust one another (step I6), so the HOST server too can consider the MS user reliable.

Figure 1:
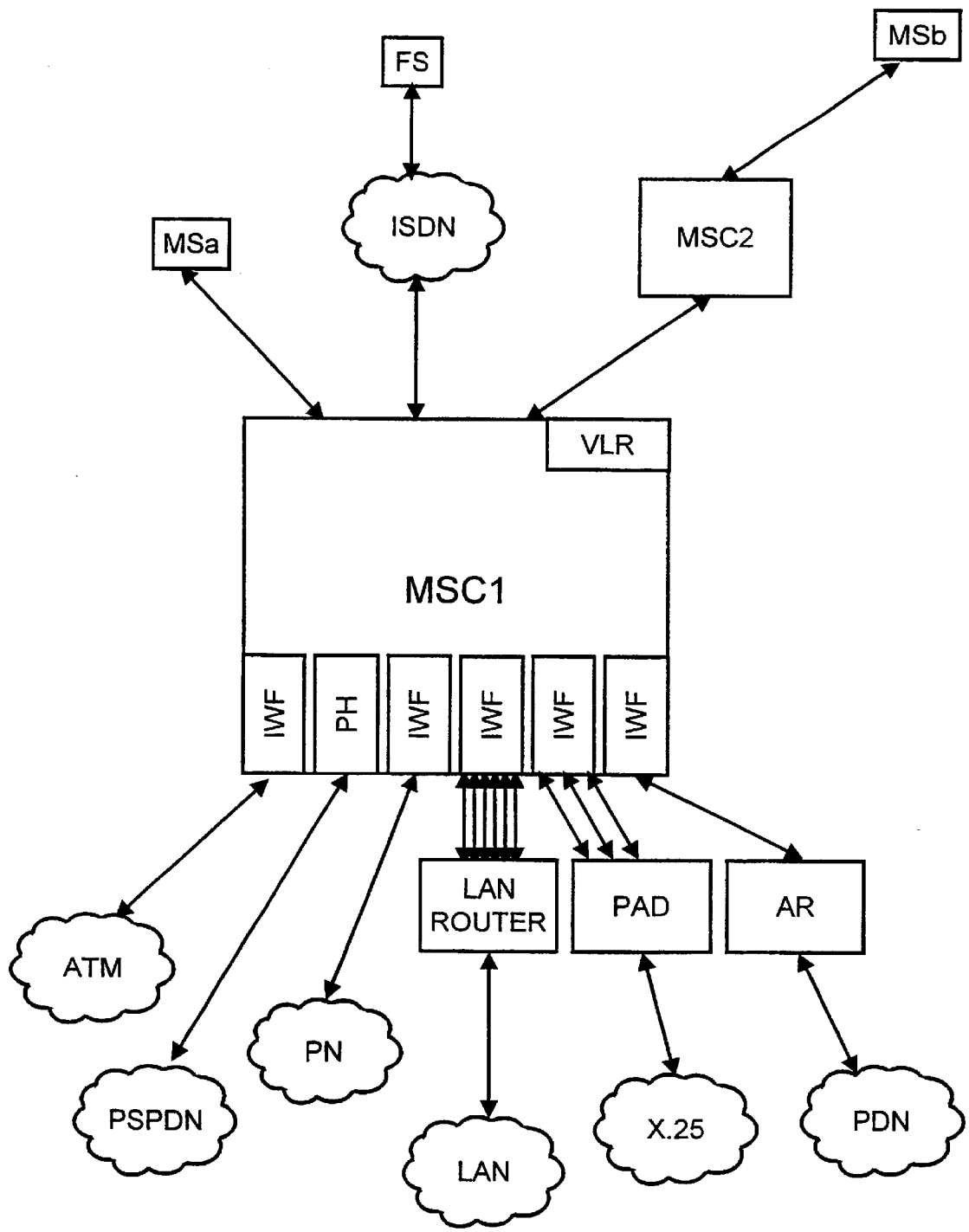
Figure 2:
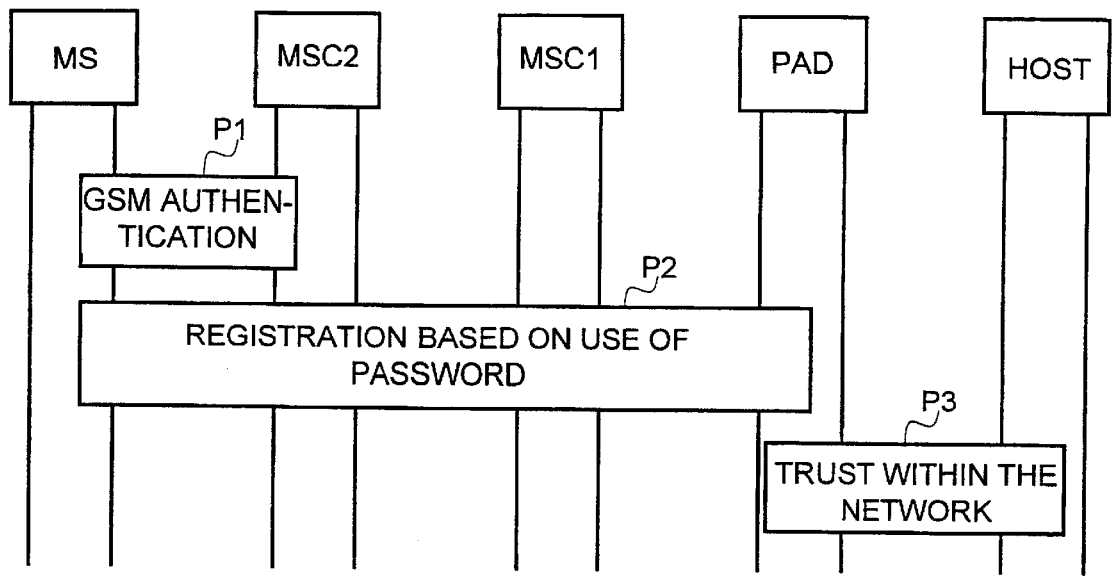
FIG. 2 shows an example of authentication of a data service user.
Figure 3:
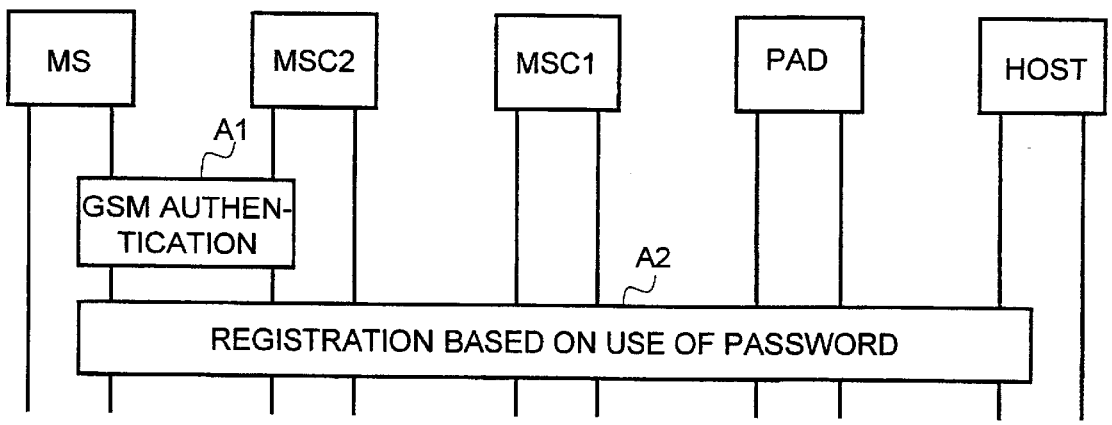
FIG. 3 shows another example of authentication of a data service user.

In the examples presented in the foregoing only such situations were considered where the exchange is connected to the data network with the aid of a packet assembler/disassembler PAD. It is obvious, however, that in order to improve data security the invention may also be used in other data access techniques, of which a few examples are shown in FIG. 1.

In the foregoing, the invention was described as applied to a GSM system, but the invention is not limited to this system. The invention can be used in the same manner in all mobile station networks, satellite networks, cordless systems, such as the DECT (Digital European Cordless Telephone), and trunking networks, such as the TETRA (Trans-European Trunked Radio). Nor need the telephone system necessarily be a circuit switched system as in the examples, but the invention may also be used for connecting packet switched systems, such as the GPRS (General Packet Radio Service), to data networks. Another example of a non-circuit switched system, to which the invention can be applied, are systems utilising the ATM cell-switched forwarding method. The ATM is designed for use e.g. in the planned mobile communications systems of the third generation.

Nor is it essential for the basic inventive idea that a telephone system which is switched on to a data network is explicitly a mobile station network. When applying the invention to a mobile communications network, however, it is possible to make use of the existing authentication functions of the mobile communications system in order to verify the identity of the subscriber who wants to have a connection with the data network. However, the invention may be implemented in the same way also to the exchange of a fixed network by defining a closed user group including network users and a data network access point.

What is claimed is:

1. Method of improving the data security of a data service connected to a telephone network in a telephone system including subscribers, subscriber equipment and telephone exchanges, wherein the data service is connected to the telephone exchange by a data access, the call number of which is chosen by the subscriber when starting the data call, and in which system it is possible to form closed user groups, the inside calls of which are different as regards the way in which they are set up from calls made outside the user group and from calls received from outside the user group, whereby data concerning the user group is stored in the subscriber data of the subscribers belonging to the group, characterized in that a closed user group is formed which includes the data access and the users of the data service which it connects with the telephone system, and data indicating membership in the user group is added to the access data of the data access, when starting a data call, the subscriber sends a request for set-up of a data call connection as a call of the closed user group, and if the subscriber has the right to calls within the user group:

the data call is routed to that telephone exchange which has a connected data access whose call number was chosen by the subscriber, in the telephone exchange, the user group data of the call is compared with the access data of the data access, such incoming calls are barred which come from outside the closed user group of the data service, and such incoming calls to the data access are set up which are within the closed user group of the data service, authentication of calls from the telephone system through the data access point, are accepted, and the subscriber who has taken contact is given access to the data service.

2. Method as defined in claim 1, characterized in that the telephone system is a mobile communications system including at least one mobile switching centre which has a direct data access to the data network.

3. Method as defined in claim 1, characterized in that the subscriber is defined as belonging to the closed user group of the data service by adding to the subscriber data an identifier (CUG IC) defining the closed user group unambiguously in the telephone network.

4. Method as defined in claim 3, characterized in that it is found that the subscriber is entitled to calls within the closed user group of the data service, if the subscriber's subscriber data shows that the subscriber belongs to the closed user group of the data service.

5. Method as defined in claim 1, characterized in that data is defined in the subscriber's subscriber data to show that when setting up data calls the closed user group of the data service is used as the default closed user group.

6. Method as defined in claim 5, characterized in that when setting up a data call, the data of the closed user group of the data service is used automatically as the user group data.

7. Method as defined in claim 1, characterized in that when relaying the subscriber's request for set-up of a data call, the subscriber equipment defines the closed user group of the data service for use in the call as the user group.

8. Method as defined in claim 1, characterized in that the data access is defined as belonging to the closed user group of the data service by adding to its access data in the telephone system data on an identifier defining unambiguously the closed user group of the data service in the telephone network, incoming calls outside the user group are barred by adding to the access data data on barring of incoming calls coming from outside the closed user group, and calls within the user group are permitted by adding to the access data data on access for calls within the user group.

9. Method as defined in claim 8, characterized in that in the telephone exchange having a data access connected to it whose call number the subscriber has chosen, a check is made to find out from the user group data added to the access data of the data access whether the data access belongs to the user group to use in the incoming data call, set-up of the call is barred, if the data access does not belong to the user group to be used in the data call, and a call is set up to the data access, if the data access belongs to the user group to be used in the data call.

10. Method as defined in claim 1, characterized in that the data access is a matching unit of an ATM network.

11. Method as defined in claim 1, characterized in that the data access is a packet assembler/disassembler PAD.

12. Method as defined in claim 1, characterized in that the data access is a router of a local area network LAN.

13. Method as defined in claim 1, characterized in that the data access is a subscriber line allocated fixedly for use by the data network.

14. Method as defined in claim 1, characterized in that the data access is a packet handler.

15. Method as defined in claim 1, characterized in that the data access is an access router AR.

16. Method as defined in claim 1, characterized in that the data signal for use in the data call connection is in accordance with the CCITT V.110 specification.

17. Method as defined in claim 1, characterized in that the data signal for use in the data call connection is in accordance with the CCITT V.120 specification.

18. Method as defined in claim 1, characterized in that the data signal for use in the data call connection is in accordance with the CCITT V.24/V.28 specification.

19. Method as defined in claim 1, characterized in that the data signal for use in the data call connection is an analogous modem signal.

* * * * *

UNITED STATES PATENT AND TRADEMARK OFFICE
CERTIFICATE OF CORRECTION

PATENT NO.    : 6,662,005 B1
DATED         : December 9, 2003
INVENTOR(S)   : Keijo Palviainen It is certified that error appears in the above-identified patent and that said Letters Patent is hereby corrected as shown below:

Title page,
Item [75], Inventor, last name should read -- Palviainen --

Signed and Sealed this

Sixth Day of July, 2004

JON W. DUDAS
*Acting Director of the United States Patent and Trademark Office*